United States Patent
Faris

(10) Patent No.: US 6,195,205 B1
(45) Date of Patent: Feb. 27, 2001

(54) MULTI-MODE STEREOSCOPIC IMAGING SYSTEM

(75) Inventor: Sadeg Faris, Pleasantville, NY (US)

(73) Assignee: Reveo, Inc., Hawthorne, NY (US)

(*) Notice: Subject to any disclaimer, the term of this patent is extended or adjusted under 35 U.S.C. 154(b) by 0 days.

(21) Appl. No.: 08/390,807

(22) Filed: Feb. 15, 1995

Related U.S. Application Data

(63) Continuation of application No. 08/154,077, filed on Nov. 19, 1993, now abandoned, which is a continuation of application No. 07/809,136, filed on Dec. 18, 1991, now Pat. No. 5,264,964.

(51) Int. Cl.[7] .................................................... G02B 27/22

(52) U.S. Cl. ........................................... 359/465; 359/246

(58) Field of Search ................................... 359/462–465, 359/246

(56) References Cited

U.S. PATENT DOCUMENTS

| | | | |
|---|---|---|---|
| 1,435,520 | 11/1922 | Hammond | 352/63 |
| 2,099,694 | 11/1937 | Land | 352/60 |
| 2,301,254 | 11/1942 | Carnahan | 348/57 |
| 2,305,687 | 9/1942 | Carnahan | 359/489 |
| 2,317,675 | 4/1943 | Athey et al. | |
| 2,417,446 | 3/1947 | Reynolds | 359/462 |
| 2,571,612 | 10/1951 | Rines | 342/180 |
| 2,631,496 | 3/1953 | Rehorn | 359/465 |
| 2,647,440 | 8/1953 | Rehoan | 359/489 |
| 2,949,055 | 8/1960 | Blackstone | 348/144 |
| 2,983,835 | 5/1961 | Frey | 348/42 |
| 3,275,745 | 9/1966 | Var | 348/57 |
| 3,371,324 | 2/1968 | Sinto | 359/489 |
| 3,507,549 | 4/1970 | Land | 359/465 |
| 3,741,626 | 6/1973 | Wentz | 359/250 |
| 3,807,831 | 4/1974 | Soret | 349/141 |
| 3,821,466 | 6/1974 | Roese | 348/56 |
| 3,858,001 | 12/1974 | Bonne | 348/57 |
| 3,944,351 | 3/1976 | Ito et al. | 353/31 |
| 4,122,484 | 10/1978 | Tan | 348/58 |
| 4,281,341 | 7/1981 | Byatt | 359/465 |

(List continued on next page.)

FOREIGN PATENT DOCUMENTS

| | | |
|---|---|---|
| 489888 | 8/1938 | (GB). |
| 1523436 | 8/1978 | (GB). |
| 2111798 | 7/1983 | (GB). |
| 2231754 | 11/1990 | (GB). |
| 5389959 | 3/1980 | (JP). |
| 59264515 | 6/1986 | (JP). |
| 6159555 | 9/1987 | (JP). |

OTHER PUBLICATIONS

"Stereoscopic real–time and multiplexed video system" by Lenny Lipton, StereoGraphics Corporation, published in SPIE vol.1915, Stereoscopic Displays and Applications IV, pp. 6–11, Feb., 1993.

Technical Brochure for the SGS 310, 410, 610 Stereoscopic 3–D Display Kits, published Jun. 1992 from Tektronix Display Products, Beaverton, Oregon.

Article in NASA Tech Briefs, Sep. 1991, pp. 12–13, Describing CrystalEyes® stereo 3–D viewing system from StereoGraphics Corp., San Rapheal, CA.

(List continued on next page.)

Primary Examiner—Scott J. Sugarman
(74) Attorney, Agent, or Firm—Thomas J. Perkowski Esq.

(57) ABSTRACT

A multi-mode stereoscopic imaging system is described. It is the first stereo system which is convertible back and forth from the auto stereo viewing mode without glasses to the binocular stereo viewing mode with glasses. It is based on micro-polarizer arrays and spatial multiplexing of images. The system consists of a stereo image component and an auto parallax barrier component. Both components use the properties of $\mu$Pols. Switching from one mode to the other is accomplished manually, and electronically with the aid of a liquid crystal light valve. The system combines the benefits of auto-stereo imaging and the binocular stereo imaging of prior art techniques without their limitations.

7 Claims, 17 Drawing Sheets

U.S. PATENT DOCUMENTS

| | | | |
|---|---|---|---|
| 4,286,286 | 8/1981 | Jurosson et al. | 348/56 |
| 4,431,265 | 2/1984 | Benton | 348/51 |
| 4,504,856 | 3/1985 | Jackman | 348/57 |
| 4,523,226 | 6/1985 | Lipton et al. | 358/88 |
| 4,562,463 | 12/1985 | Lipton | 348/56 |
| 4,566,758 | 1/1986 | Bos | 349/128 |
| 4,582,396 | 4/1986 | Bos et al. | 349/180 |
| 4,583,117 | 4/1986 | Lipton | 348/47 |
| 4,588,259 | 5/1986 | Sheiman | 359/465 |
| 4,641,178 | 2/1987 | Street | 348/57 |
| 4,670,744 | 6/1987 | Buzak | 345/6 |
| 4,709,263 | 11/1987 | Brumage | 348/42 |
| 4,719,507 | 1/1988 | Bos | 348/57 |
| 4,723,159 | 2/1988 | Imsand | 348/50 |
| 4,792,850 | 12/1988 | Lipton | 348/57 |
| 4,873,572 | 10/1989 | Miyuzaki et al. | 348/45 |
| 4,877,307 | 10/1989 | Kalmanash | 359/465 |
| 4,943,852 | 7/1990 | Femano et al. | 348/49 |
| 4,995,718 | 2/1991 | Jachimonowicz | 353/31 |
| 5,007,715 | 4/1991 | Verhulst | 349/15 |
| 5,113,285 | 5/1992 | Franklin | 359/465 |
| 5,264,964 * | 11/1993 | Faris | 359/465 |

OTHER PUBLICATIONS

"Large Screen Electro–stereoscopic Displays" by Lenny Lipton, published in SPIE vol.1255 Large–Screen Projection Display II, pp. 108–113, Feb. 1990.

"Field–sequential Electronic Stereoscopic Projector" by Lenny Lipton, published in SPIE Vol. 1081 Projection Display Technology Systems and Applications, pp. 94–100, Jan. 1989.

"Compatibility of Stereoscopic Video Systems with Broadcast Television Standards" by Lenny Lipton, published in SPIE vol.1083 Three–Dimensional Visualization and Display Technologies, pp. 95–101, 1989.

"Field–Sequential Stereoscopic Viewing Systems Using Passive Glasses" by Bos, et al., published in Proceedings of the SID, vol. 30, No. 1, pp. 39–43, 1989.

"A Real–time Autostereoscopic Multiplanar 3D Display System" by Rodney Williams, et al. of Texas Instruments, Inc., published in SID 88 DIGEST, pp. 91–94, 1988.

"High–Performance 3D Viewing Systems Using Passive Glasses", by Philip Bos, published in SID 88 DIGEST, pp. 450–453, 1988.

"Experience with Stereoscopic Devices and Output Algorithms" by James S. Lipscomb, published in SPIE vol. 1083 Three–Dimensional Visualization and Display Technologies, pp. 28–34, 1989.

"3–D Comes Home" by Tom Waters, published in Discover, May 1988, pp. 30–32.

"Circular Polarization Image Selection for Timeplex Stereoscopic Video Devices" by Lenny Lipton, Stereographics Corporation, published in SPIE vol. 779 Display System Optics, May 1987, pp. 41–44.

"Three–dimensional TV with cordless FLC Spectacles" by W.J. Hartmann et al., published in Information Display, vol. 10, 1987, pp. 15–17.

"Holographic Display of Three–Dimensional Images" by Larry Hodges et al., published in Information Display, vol. 10, 1987, pp. 8–11.

"Hard copy for true three–dimensional images" by Larry Hodges, et al., published in Information Display, vol.9, 1987, pp. 12–15,25.

"True three–dimensional CRT–based displays" by Larry Hodges, et al., published in Information Display, vol.5, 1987, pp. 18–22.

"Holographic Micropatterns and the Ordering of Photographic Grains in Film Systems"(Abstract) by James Cowan, et al., published in ACTA Polytechnica Scandinavica, Applied Physics Series No. 149, Proceedings of Image Science '85, vol.1, Jun. 1985.

"Three–dimensional Projection with Circular Polarizers" by Vivian Walworth, et al., published by SPIE vol. 462 Optics in Entertainment II, Jan. 1984, pp. 64–68.

"Varifocal Mirror Techniques for Video Transmission of Three–Dimensional Images" by M.C. King, et al., published in Applied Optics, vol.9, No.9, Sep. 1970, pp. 2035–2039.

Section 14.6.3 Dichroic Polarizers (pp. 716–718), in Principles of Optics (Fourth Edition) 1970, by Max Born and Emil Wolf, published by Pergamon Press, Oxford.

"A New Approach to Computer–Generated Holography" by M.C. King, et al., published in Applied Optics, vol.9, No. 2, Feb. 1970, pp. 471–475.

Chapter 10, Section10.1 Introduction to Polarized Light, Section 10.2 Methods of Producing Polarized Light, and Section 10.3 The Transverse Nature of Light (pp. 485–520), in Optics by Miles V. Klein, published by John Wiley & Sons, Inc. New York.

Chapter 8, Polarization pp. 394–450, in Waves: Berkeley Physics Course–vol. 3, by Frank S. Crawfrod, Jr.

Low–Cost 3–D TV in Electronics (Edited by Alexander A. McKenzie), Jul. 1953, at page 1996.

Proposal entitled "3–D Flat Panel Color Display PRDA 89–9 Technical/Management and Cost" prepared for Directorate of R&D Contracting ASD/PMRNB, Wright–Patterson AFB, Ohio, by Honeywell, Inc. Systems and Research Center, Phoenix Technology Center, Aug. 1989.

The 1993 product brochure entitled "Professional Products" from the 3D TV Corporation, of San Rafael, California (10 Pages).

* cited by examiner

MULTI-MODE STEREOSCOPIC IMAGING SYSTEM

RELATED CASES

This is a Continuation of application Ser. No. 08/154,077 filed Nov. 19, 1993, now abandoned which is a Continuation application of Ser. No. 07/809,136 filed Dec. 18, 1991, U.S. Pat. No. 5,264,964.

BACKGROUND OF THE INVENTION

1. Field of the Invention

This invention relates in general to the field of 3-D stereo imaging and display systems, including 3-D stereo video computer graphics displays, stereo photographic systems, 3-D movies, and 3-D stereo printers.

2. Description of Related Art

This application is identical to and replaces Applicant's Ser. No. 7/612,494, now abandoned, which was unintentionally and inadvertently abandoned. Since the invention of the stereoscope in 1847 by David Brewster man continues his quest for copying natures 3-D images instead of being content with the planar 2-D images which lack the realism due to the absence of depth cues. Realistic 3-D imaging is compatible with our stereo vision. Many techniques have been devised and developed for producing 3-D images with varying degrees of success and image qualities. These techniques generally belong to two major classes (FIG. 1a), the Auto-Stereoscopic imaging class which produces 3-D images which can be viewed freely without spectacles, and the Binocular Stereoscopic imaging class which produces 3-D images which require the viewers to wear spectacles. Each of the two classes has a group of distinct techniques that have been used in some applications. My co-pending application Ser. No. 07/536,190, now abandoned, gives an overview of these techniques, their operating principles, their advantages and disadvantages. In Ser. No. 7/536,190, I introduced a new 3-D imaging technique based on spatial multiplexing of images and micro-polarizer arrays ($\mu$Pol) and pointed to its advantages over prior art techniques. It depends on the ability to manufacture the $\mu$Pols which is taught in my co-pending application Ser. No. 7/536,419, now U.S. Pat. No. 5,327,285. One of the major advantages of this so called $\mu$Pol imaging technique is that it can be used in a much wider application spectrum than prior techniques. Another advantage is its ability to overcome the shortcomings of prior art techniques. Many uses of the $\mu$Pol technology are described in co-pending applications Ser. No. 7/561,104, U.S. Pat. No. 5,096,520; Ser. No. 7/554,743, now abandoned; Ser. No. 7/587,664, U.S. Pat. No. 5,165,013; Ser. No. 7/554,742, U.S. Pat. No. 5,121,343; Ser. No. 7/561,090, now abandoned; and Ser. No. 7/561,141, now abandoned.

This invention shows how the use of $\mu$Pol technology leads to a totally new and distinct 3-D stereo imaging class which is referred to as the Multi-Mode Stereoscopic Imaging class as shown in FIG. 1b. The main feature of this class is the convertibility from one viewing mode to another. It is capable, for instance, of producing 3-D images which can be viewed with no glasses (Auto-Mode) which can then be switched by the user to the Binocular Mode of viewing with glasses. The two prior art classes have either one viewing mode or the other but never both at the same time.

SUMMARY OF THE INVENTION

The principal object of the present invention is the use of $\mu$Pol technology to teach a new imaging class called the Multi-Mode Stereoscopic Imaging which is capable of producing stereo images which can be converted by the user into several viewing modes.

Another object of this invention is a multi-mode stereoscopic imaging system which combines the attractive features of the auto-stereoscopic imaging and the binocular imaging with the $\mu$Pol technology advantages resulting in a superior system.

DETAILED DESCRIPTION OF THE PREFERRED EMBODIMENTS

Figure 1A:
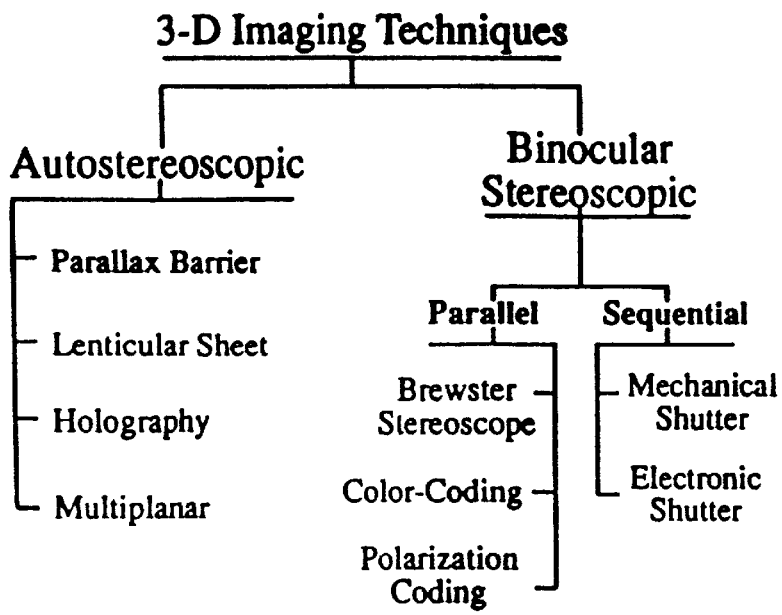
FIG. 1a illustrates the classification of prior art 3-D imaging techniques.
Figure 2:
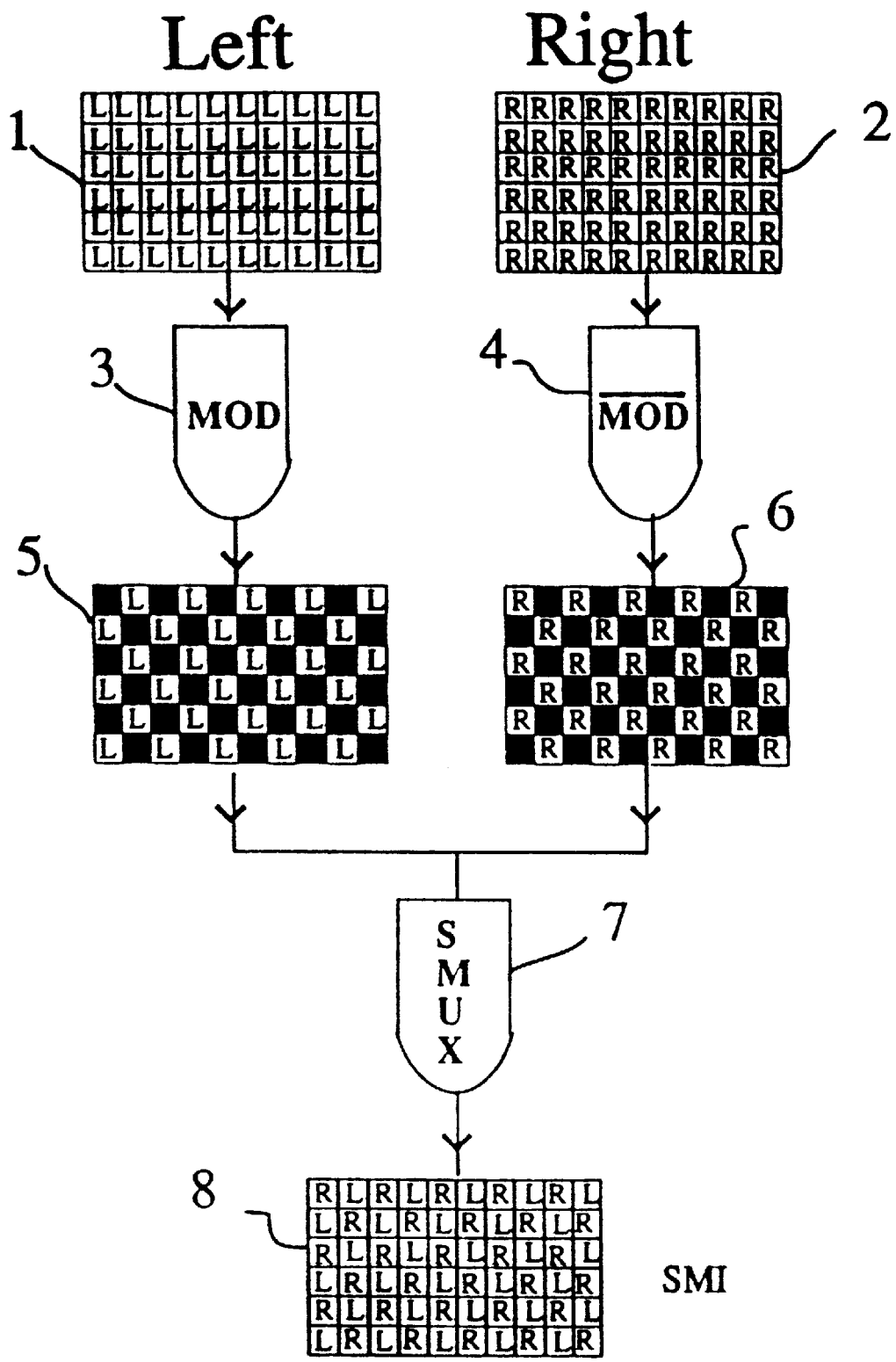
FIG. 2 illustrates the principles of spatial multiplexing of images
Figure 3A:
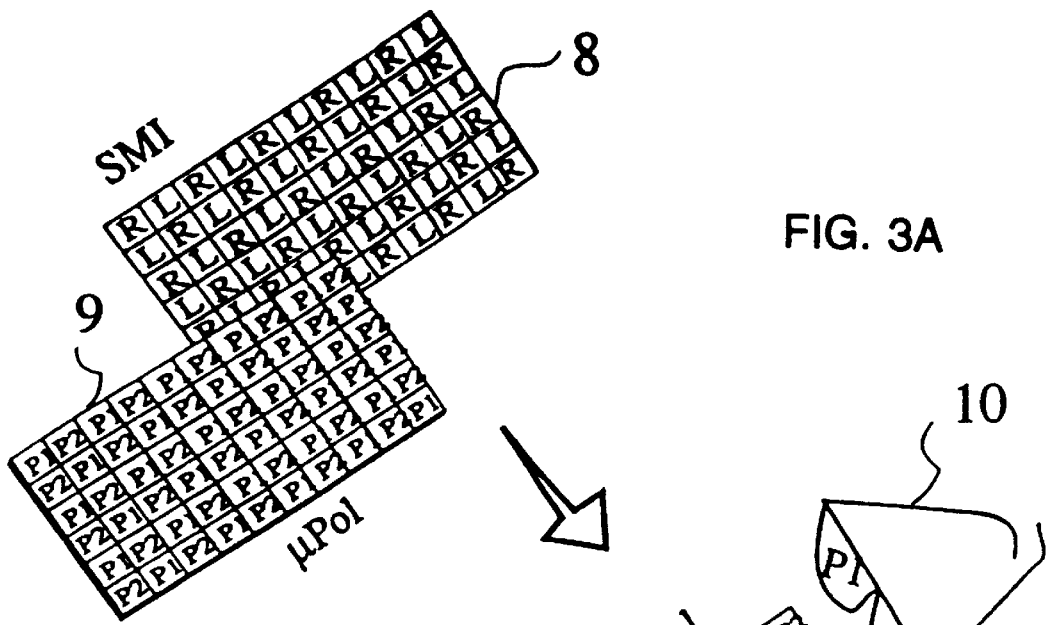
FIG. 3 shows the use of micro-polarizer sheets for demultiplexing and viewing of the spatially multiplexed image.
Figure 3B:
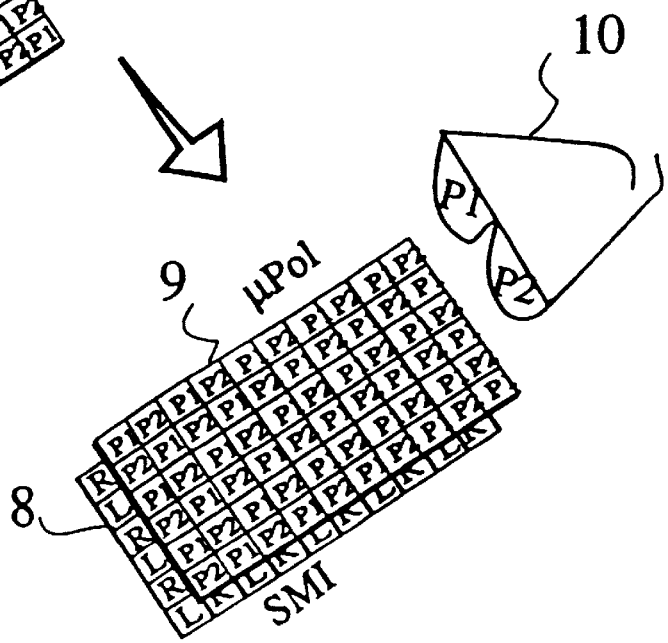
Figure 3C:
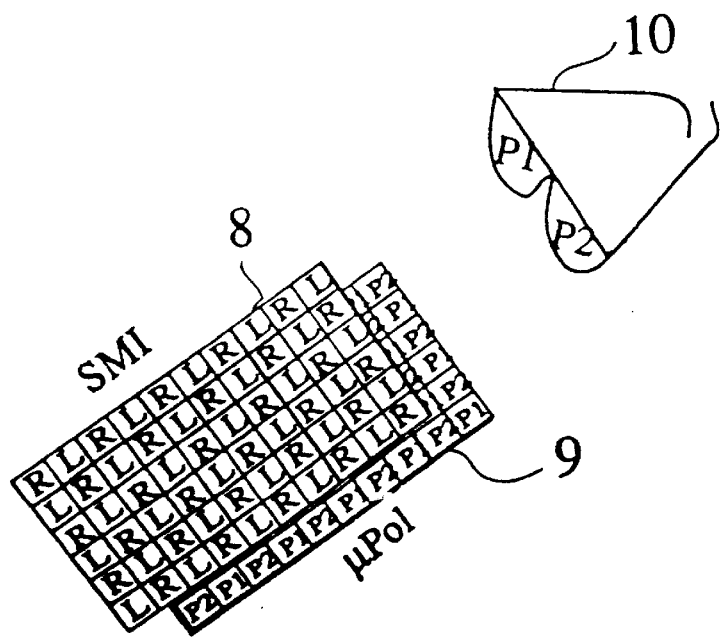

The invention is based on two fundamentally new concepts combined for the first time to record and display 3-D images. They are: Spatial Multiplexing of left and right images and Micro-Polarizers. These are described in my co-pending applications: "A System For Producing 3-D Stereo Images", Ser. No. 7/536-190, and "Methods For Manufacturing Micropolarizers", Ser. No. 7/536-419. FIG. 2 illustrates the spatial multiplexing principles. The data representing the left and right images are stored in a bit map format (other formats may also be used) in left memory array 1 (L-RAM), and right memory array 2 (R-RAM) respectively. Each pixel in the array has N-bits for color and gray-scale. Using a spatial checkerboard modulator MOD 3, the left image 1 is modulated and stored in the array 5. The right image is spatially modulated using the compliment of MOD 4 to produce the compliment pattern stored in array 6. The modulated images 5 and 6 are combined (multiplexed) using a spatial multiplexer 7 and the spatially multiplexed image (SMI) is stored in the array 8. The SMI 8 shows a combined left and right images side by side on a pixel by pixel basis and therefore carries the stereo information. The flow diagram of FIG. 2 is an algorithm to produce the SMI which can be implemented either in hardware or in software. In FIGS. 3a–b the SMI 8 is combined with a spatial demultiplexer 9, a micropolarizer, μPol sheet described in applications Ser. Nos. 7/536-190, and 7/536-419 and a polarization decoder 10, a pair of spectacles with polarization states P1 and P2. The SMI and the μPol arrays 9 which have the same period are aligned such that the left pixels in the SMI illuminate the P2 cells in the μPol array and the right pixels illuminate the P1 cells. Thus, the left pixels become P2 polarized and the right pixels become P1 polarized. Because of the discriminating ability of the polarized eye glasses, the left eye which has a P2 polarizer can seen only the P2-polarized left pixels, and the right eye which has a P1 polarizer can see only the P1-polarized right pixels. To achieve the 3-D stereo sensation the human brain fuses the left and right images in the same manner it deals with natural 3-D scenes. FIG. 1c shows that the SMI 8 may also be placed top of the μPol. Choosing between the configurations of FIG. 3b and FIG. 3c depends on how the SMI is illuminated, and whether the transmissive mode or reflective mode of display is used; see Ser. No. 536-190. The SMI may produced by a video display system such as CRT or liquid crystal display, or recorded on a paper from printers or photographic systems.

Figure 4A:
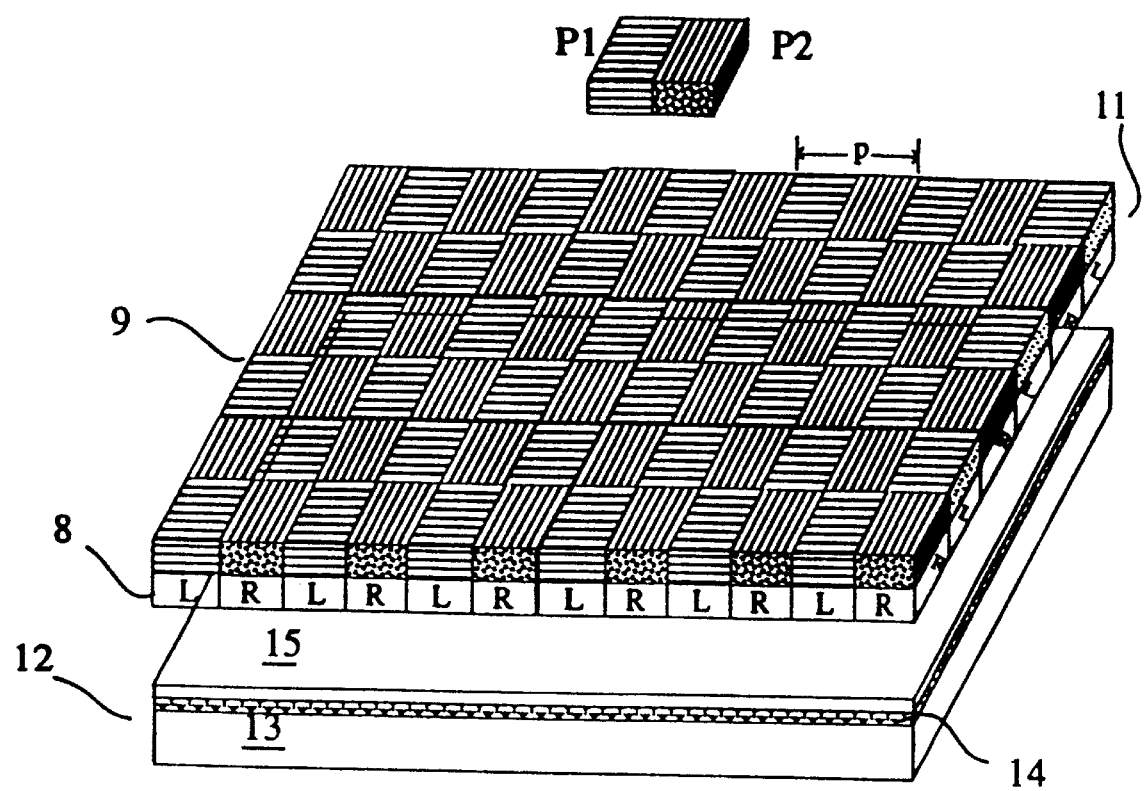
FIG. 4 shows the components of a 3-D image using $\mu$Pol technology in the form of a hard copy print.
Figure 4B:
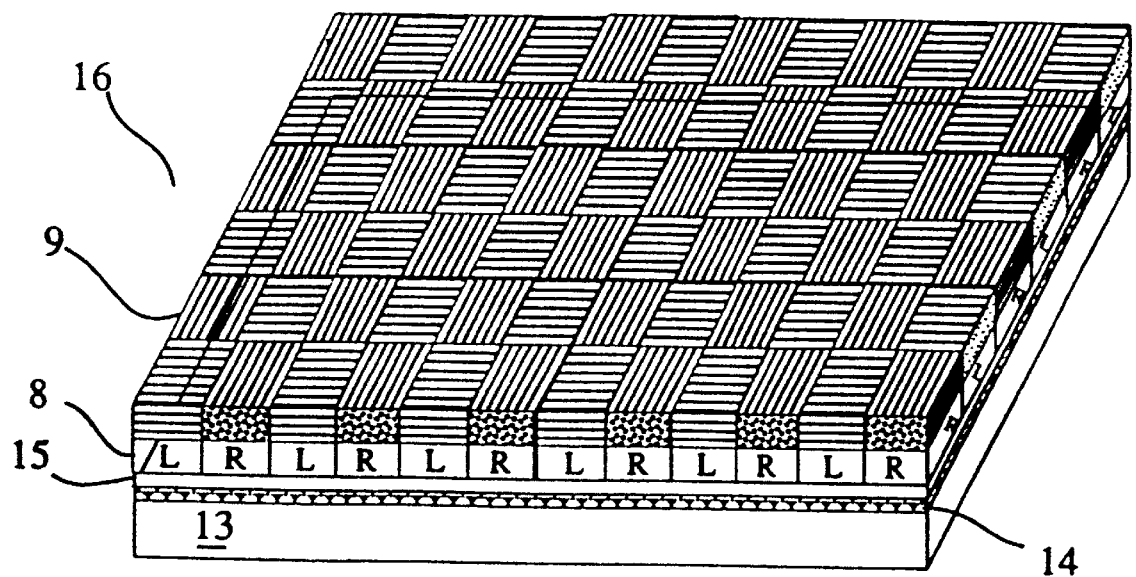
Figure 4C:
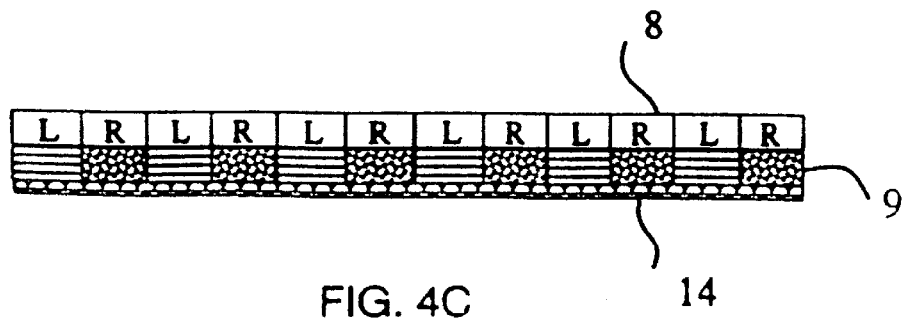

FIGS. 4a and 4b show the construction of a hardcopy. It comprises two sheets 11 and 12 laminated together to produce the output print 16. The first sheet 11 is a μPol 9 on which the SMI 8 is printed after proper alignment is ensured. The second sheet 12 consists of regular paper 13, coated with aluminum or silver flakes 14 and a clear adhesive layer 15. The aluminum or silver layer is needed to preserve the polarization and maximize the brightness. If paper only was used in 13, the polarized light striking its surface becomes depolarized and as it emerges from the μPol layer its brightness is reduced by at least 50%. FIG. 4c shows another simpler embodiment which eliminates the sheet 12 but achieves the same result by directly coating the back of the μPol 9 with a silver or aluminum film 14.

There are two classes of polarizer polymers; the absorptive class such as polyvinyl alcohol, PVA, and the reflective class such as cholesteric liquid crystal silicone, CLCS (see Robert Maurer et al, Society of Information Display SID 90 Digest, p. 110, 1990, and Martin Schadt, and Jurg Funfschilling, SID 90 Digest, p. 324, 1990). The absorptive class converts unpolarized light to linearly polarized light of state P1 by absorbing the orthogonal state P2. This absorbed light energy is converted to heat and is lost for ever. The polyvinyl alcohol, PVA, used to construct the μPols in Ser. No. 7/536-190, and Ser. No. 7/536-419 belongs to the absorptive class. Hard copies based on the absorptive class, in general, lose at least 50% of the illuminating light. The second polarizer class, reflective class, separates the incident unpolarized light into two circularly polarized states P1 and P2, one state P1 is transmitted and the other state P2 is reflected. In this case no light energy is lost to heat and therefore it is possible to convert 100% of the incident light into polarized light with the desired state of polarization. This is done by coating a sheet of CLCS with a reflective metallic film on one side, and illuminating it on the other side with unpolarized light. 50% of this light is reflected as P1, and the other 50% is transmitted as P2. This P2 light is then reflected by the metallic layer and converted into P1 (it is well known in the field of optics that a circularly polarized light of one state is converted to the orthogonal state as a result of reflection), thus all the incident light is converted to polarized light of state P1. This reflective class of polarizers when used to fabricate μΠολσ, provides at least a factor of 2 brighter 3-D stereo images than the absorptive class.

Figure 5A:
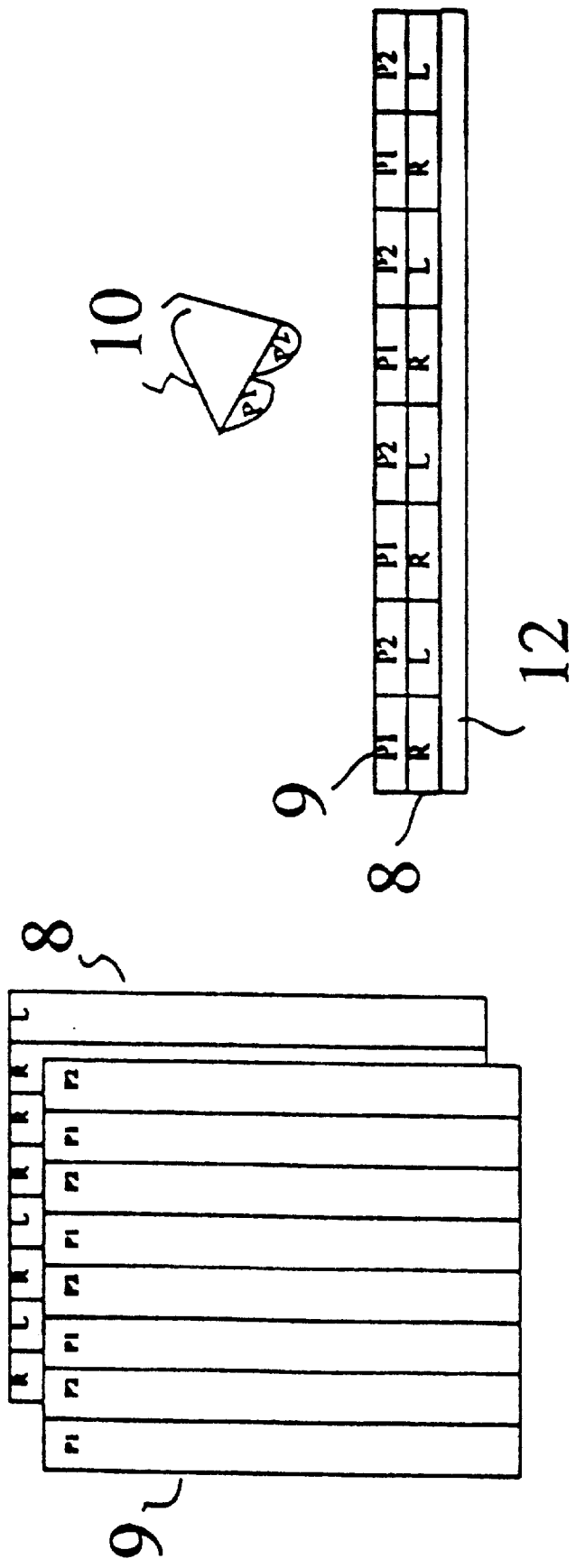
FIGS. 5a–c show the construction of a multi-mode stereo imaging system which the user can convert from one viewing mode to another
Figure 5B:
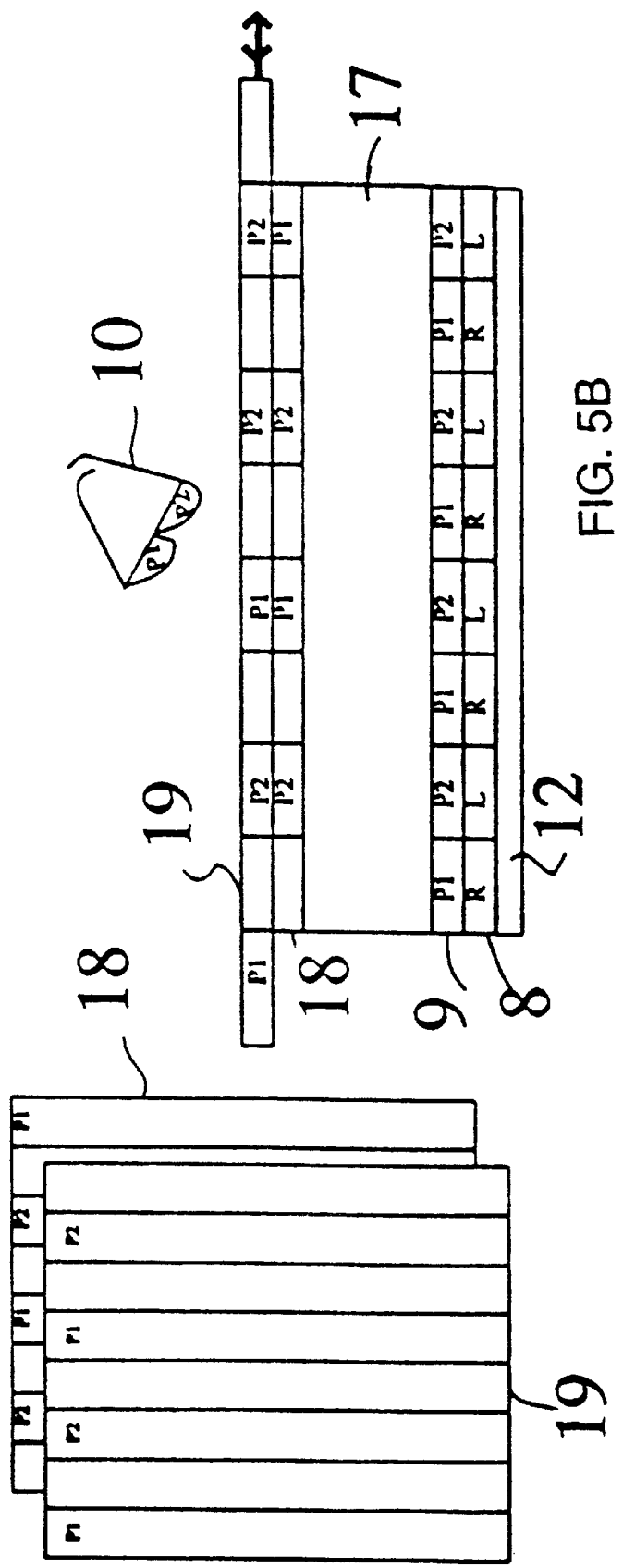
Figure 5C:
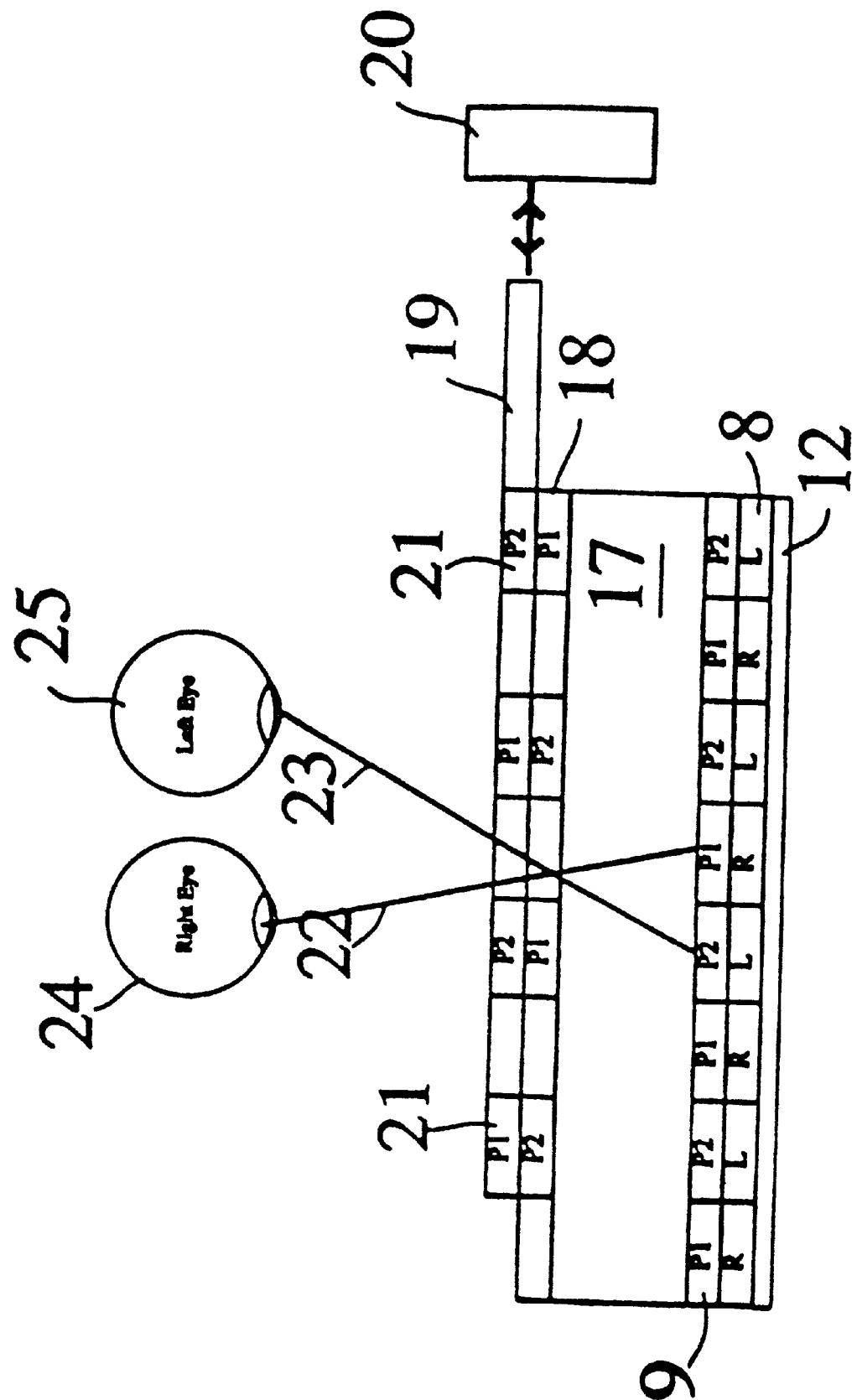
Figure 5D:
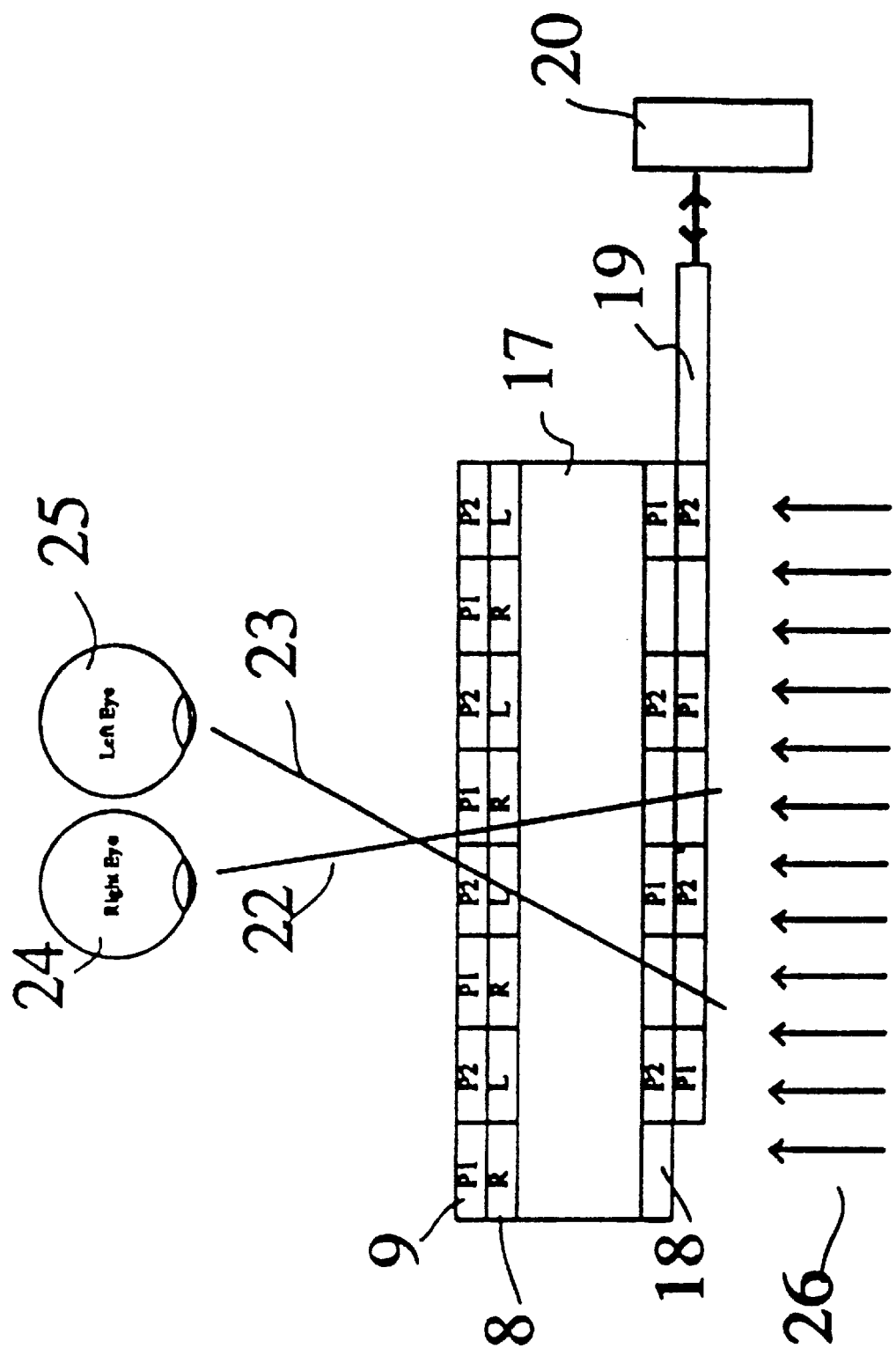
FIG. 5d shows a cross section of a mode-convertible image which can be viewed by light transmission.

The binocular stereo image in FIG. 5a is identical in construction to that of FIG. 4 except the SMI 8 and the μPol 9 are made of strips (linear array instead of 2-D array of pixels). The strip width, $W_s$, can be as small as 25 microns for photographs, or in the range of 100 to 250 microns for video displays. This system, FIG. 5a, is changed into a convertible multi-mode stereo imaging system by adding a second μPol 18 laminated to a clear substrate 17(polyester, acetate, or glass), and a third μPol 19 as shown in FIG. 5b. The μPol 18 and substrate 17 are fixed to the first μPol 9, whereas, μPol 19 is movable sideways (left and right) by means of a manual or electronic actuator. The spatial periods of μPol arrays 18 and 19 are identical and are twice the period of μPol 9. In FIG. 5b, μPol 19 is moved until the its polarization P1 regions overlap the P1 regions of μPol 18 and its the P2 regions overlap the P2 regions of μPol 18. In this position of μPol 19, and at an appropriate viewing distance $D_v$, the μPols 18 and 19 are transparent and the system remains in the binocular mode and eye glasses are still needed to view the image. However, by moving the μPol 19 until its P1 regions overlap the P2 regions of μPol 18, and its P2 regions overlap the P1 regions of μPol 18, the system is switched into the auto-mode and the image can be viewed without eye glasses. This is because of the parallax barrier created in the regions 21 where the different polarization states overlap. To achieve this auto mode, the thickness D of the substrate 17 is designed according to the following relation (S. H. Kaplan, *Theory of Parallax Barrier*, J. SMPTE, Vol. 59, 11–21, July 1952):

$$D = W_s D_v / (W_s + D_e);$$

where $D_e$ is the inter-pupil distance which is on the average 65 mm. For $W_s$=100 micron, and $D_v$=40 cm, D=600 micron. At this distance there exist viewing zones where all rays 22 emanating from the right pixels are viewed only by the right eye 24 and all rays 23 emanating from the left pixels are viewed only by the left eye 25. This is the condition of stereoscopic vision, and no spectacles are needed. Thus one is able to switch between the binocular viewing mode in FIG. 5b to the auto viewing mode in FIG. 5c. FIG. 5d shows another embodiment of the invention, a convertible multi-mode stereo system which is back lit by means of a light source 26. In this case the backing 12 is not needed, the SMI is a transparency, and the auto-mode components 17, 18, and 19 are moved in the back facing the light source 26. In FIG. 5d, μPol 19 is shown once again positioned so that its P1 and P2 regions form barriers (opaque regions) with the P1 and P2 regions of μPol 18. The rays 22 emerging from the clear regions between the barriers, illuminate the right pixels and strike only the right eye 24, meanwhile, the rays 23 emerging from the clear regions, illuminate the left pixels and strike only the left eye 25.

Figure 1B:
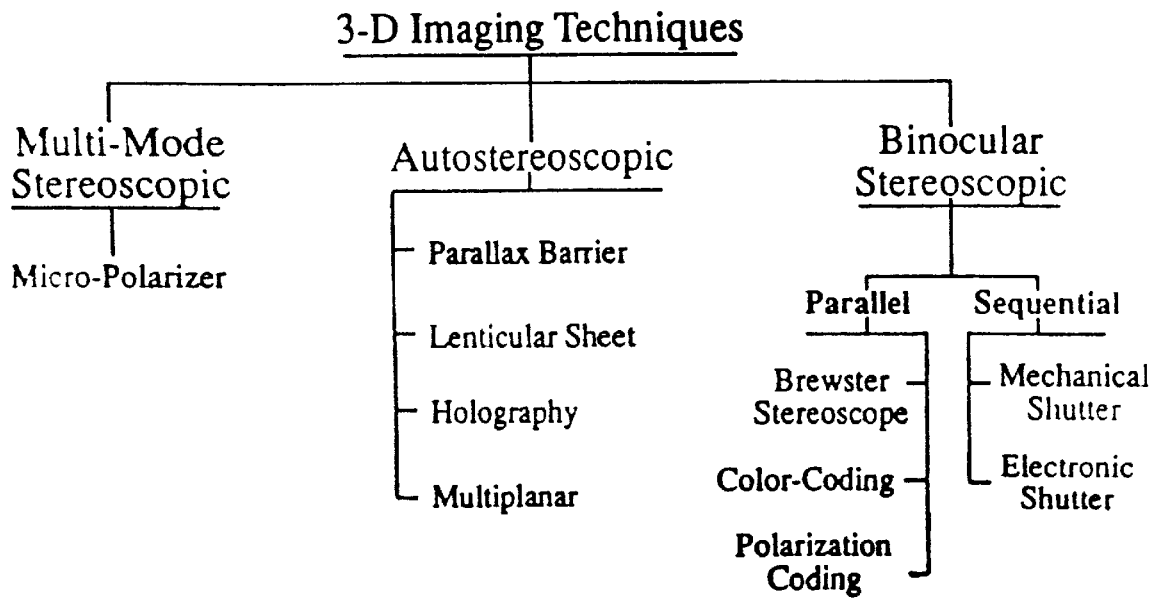
FIG. 1b illustrates the new classification of 3-D imaging techniques which includes the Multi-Mode Stereoscopic Imaging of the present invention.

The advantage of the binocular mode is the absence of the discrete viewing zones and the absence of viewing distance restrictions, but it requires polarized eye glasses. On the other hand, the auto mode does not require eye glasses but has discrete viewing zones and specific viewing distances to see stereo. Depending on the application, the ability to switch between the two modes could be desirable. Note, that prior art techniques do not posses the ability to switch between two modes, and for this reason, this invention is considered a new imaging class as illustrated by the classification of FIG. 1b. This new class combines the good features of both prior art stereo imaging classes.

Figure 6A:
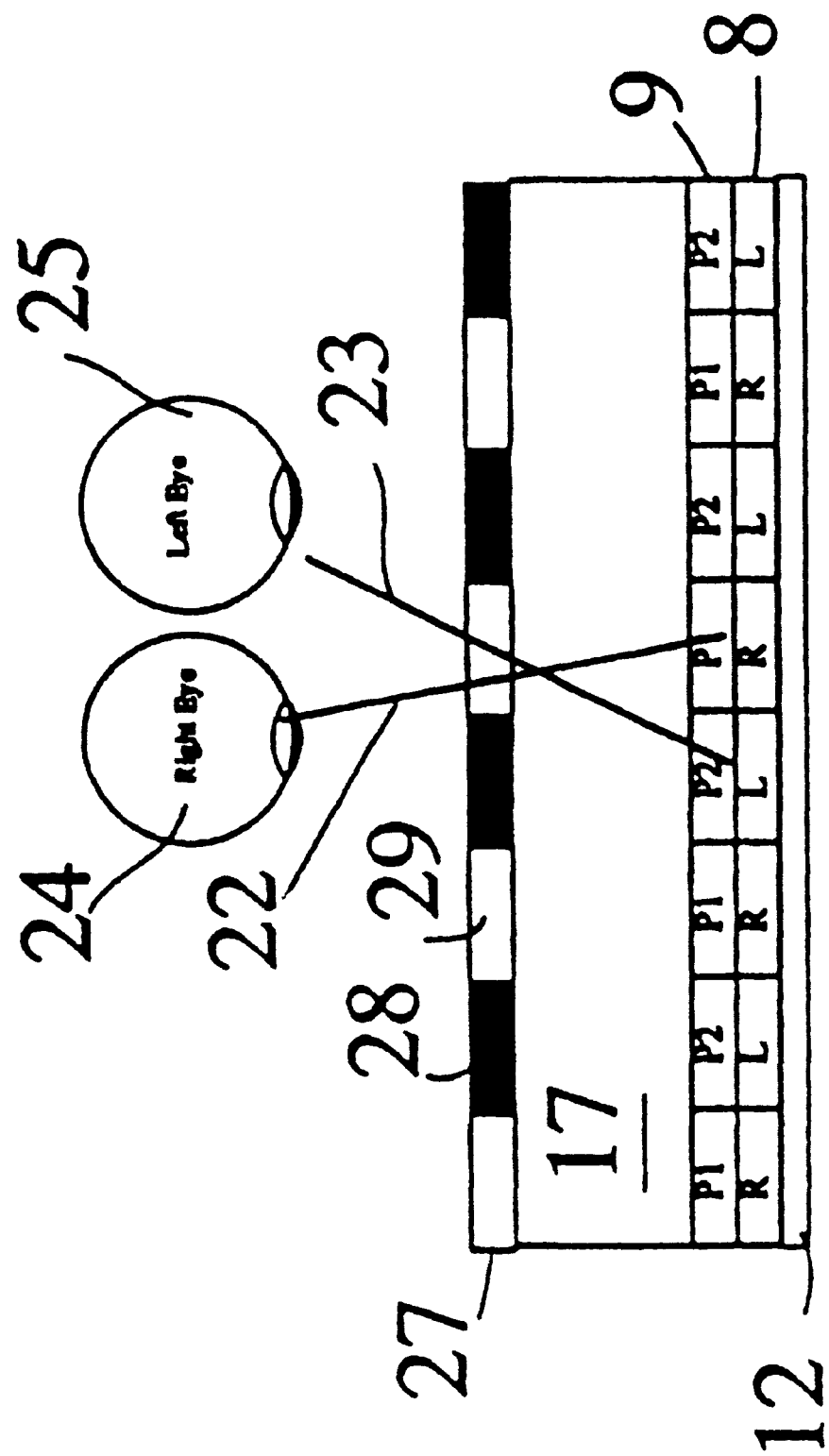
FIGS. 6a–b show cross sections illustrating the use of barrier strips to obtain the auto-stereo mode.
Figure 6B:
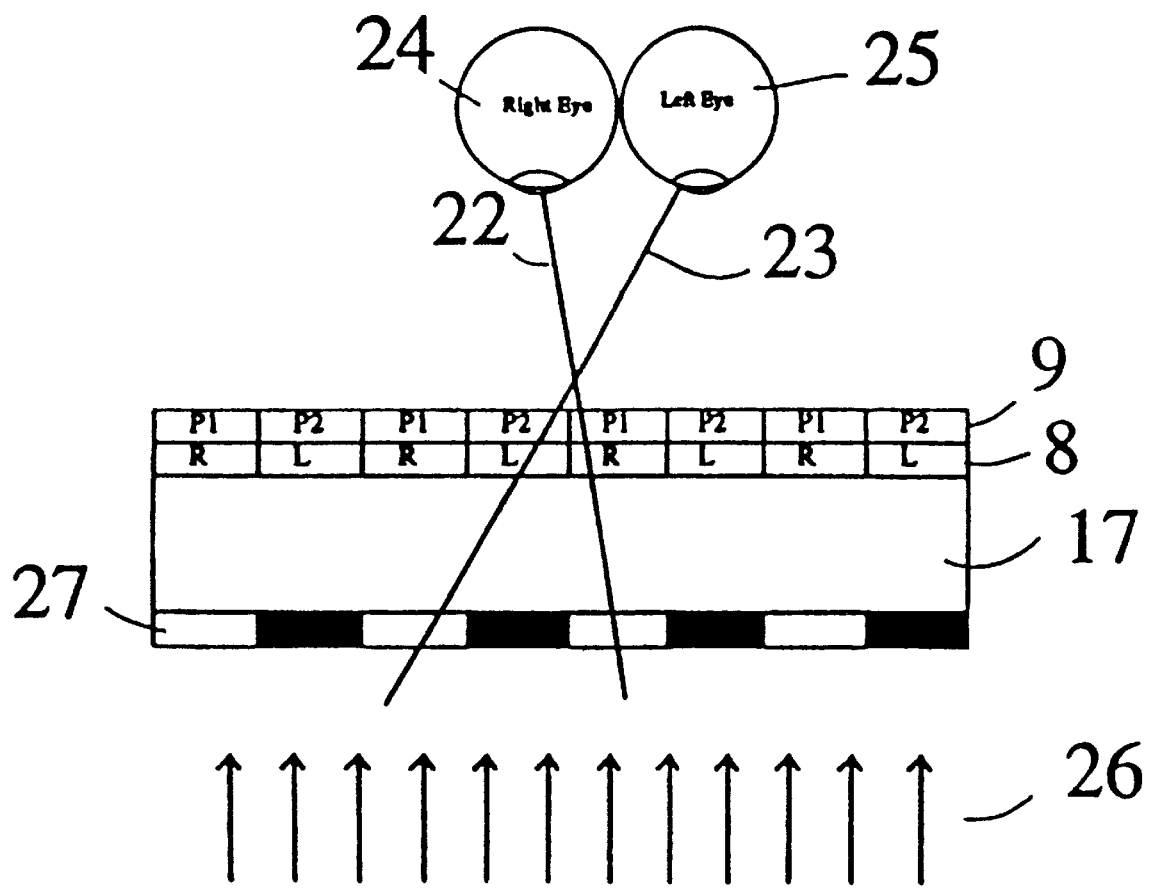

Another embodiment shown in FIGS. 6a–b achieves the auto-stereo mode by using a film 27 which has opaque regions 28 (barriers) and clear regions 29. In order to convert to the binocular mode, the film 27 is peeled away, but kept attached at the edges so that it can be placed again (remains registered) to switch back to the auto viewing mode.

Figure 7A:
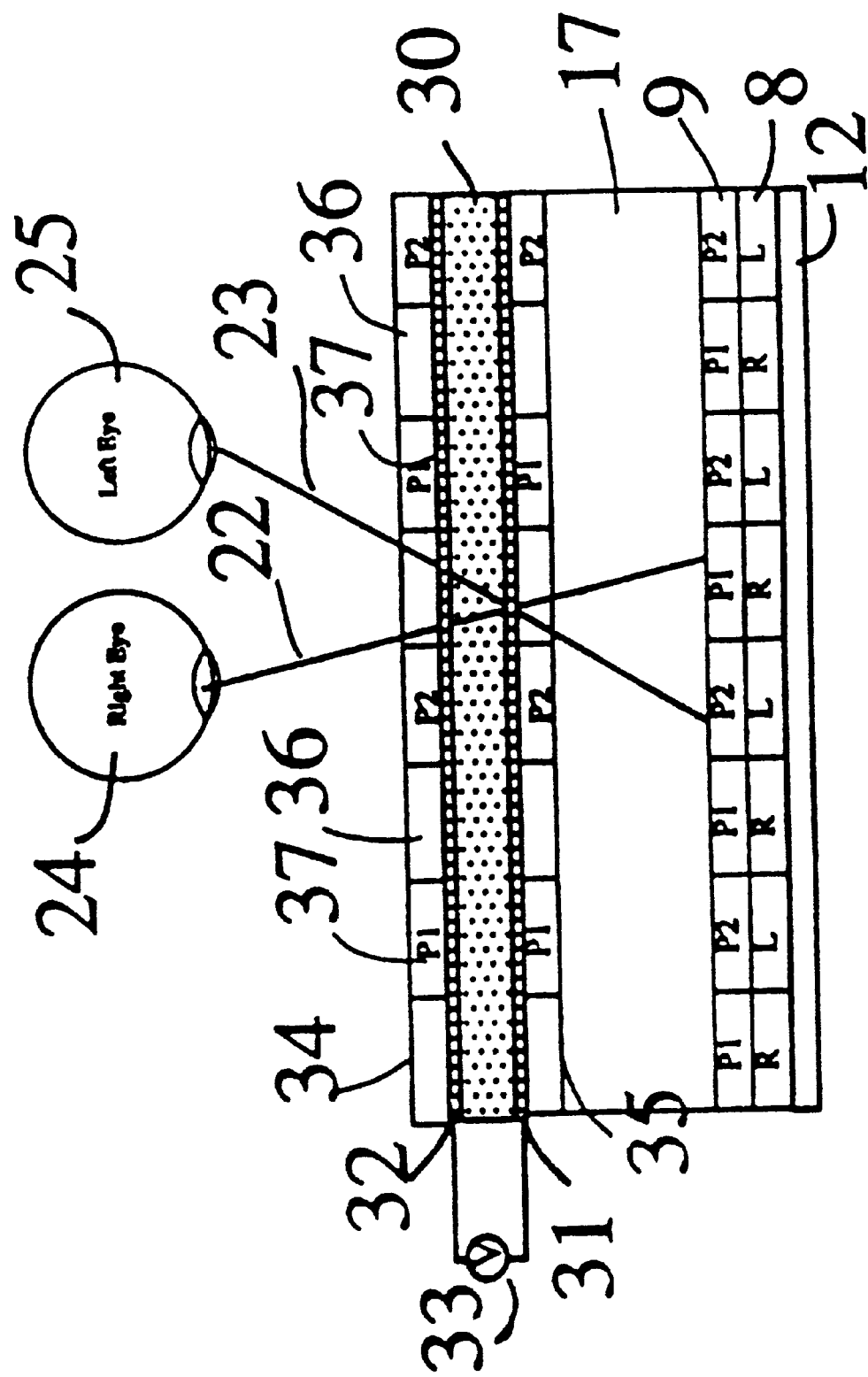
FIGS. 7a–b show cross sections illustrating the use of liquid crystal valve to electronically switch from the Auto-Stereo Mode to the Binocular Stereo Mode.
Figure 7B:
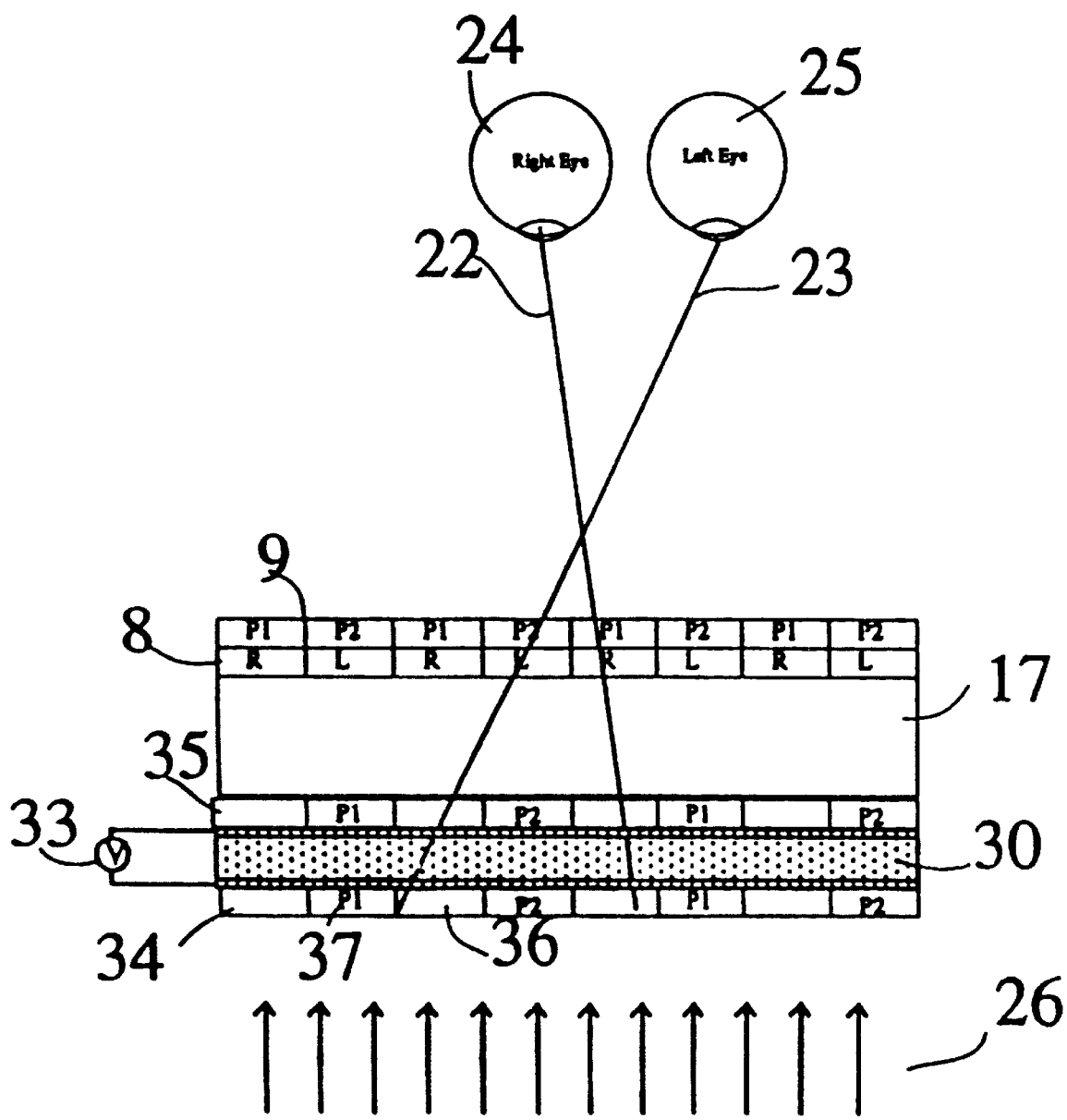
Figure 8A:
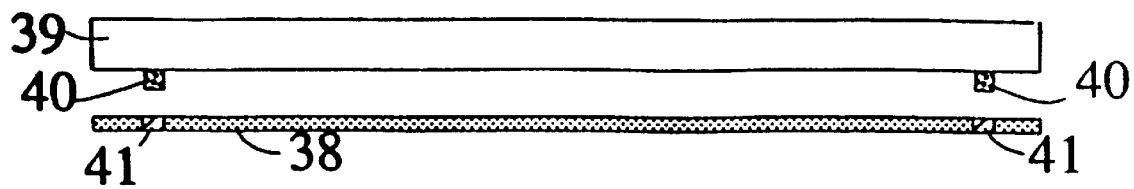
FIGS. 8a–d show cross sections of the construction of simple systems which have registration guides that allow the accurate insertion or removal of the auto-stereo components.
Figure 8B:
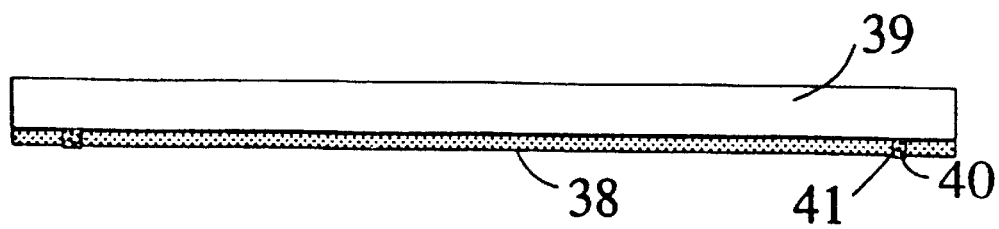
Figure 8C:
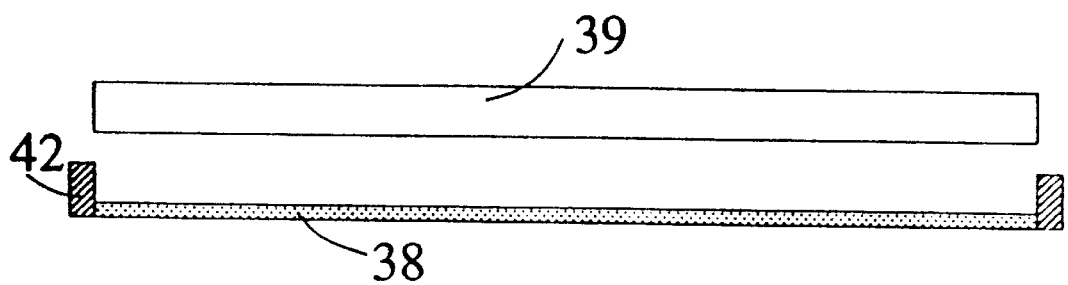
Figure 8D:
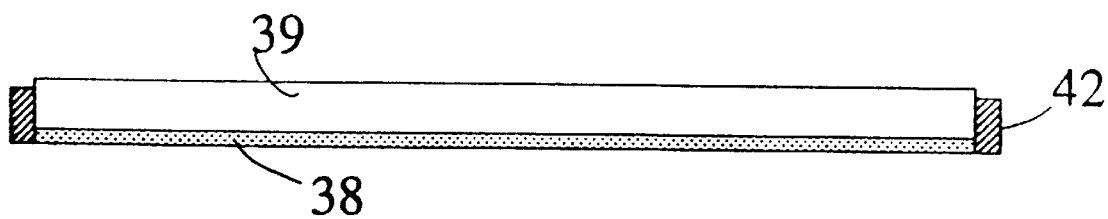

Electronic switching between auto and binocular stereo modes can be achieved by means of liquid crystal light valve in the system shown in FIGS. 7a and 7b representing the reflective and transmissive configurations respectively. The light valve is made of a 10–20 micron layer 30 of a twisted nematic liquid crystal sandwiched between two identical $\mu$Pols 34, 35, coated respectively with transparent electrodes 32 and 31 (1000 angstrom indium-tin-oxide), connected to a voltage source 33. The binocular viewing mode is obtained when the applied voltage is zero, keeping regions 37 transparent, allowing polarized light to be transmitted to the eye. Regions 36 which always remain transparent, also transmit polarized light. To switch to the auto mode, a 5 to 10 volt signal is applied to exceed a switching threshold. This alters the birefringent property of the liquid crystal so that it rotates the polarization of light by 90 degrees. Now the regions 37 are switched to the opaque state, and a parallax barrier produces the auto viewing mode.

In FIGS. 8 a–d, cross sections of manual embodiments are shown for achieving convertibility from the binocular mode to the auto mode and vice versa. The removable auto component 39 is a laminate of the substrate 17, the second $\mu$Pol 18 and the third $\mu$Pol 19, and the image component 38 is a laminate of the SMI 8, the first $\mu$Pol 9, and the reflective backing 12 (needed only in reflective viewing ). In FIG. 8a, the auto component 39 also has four cylindrical registration pins 40, 250 micron in diameter, and component 41 has 4 circular registration holes. Through the insertion of pins 40 in holes 41, the two components are attached to each other in a perfect registration and conversion to the auto mode is complete as shown in FIG. 8b. To switch back to the binocular mode, the two components are once again detached. In FIGS. 8c and 8d, the same result is achieved by using a registration frame 42 attached to the image component 38. Conversion to the auto mode is completed by inserting component 39 into the frame 42 and in contact with the image component 38.

Figure 9A:
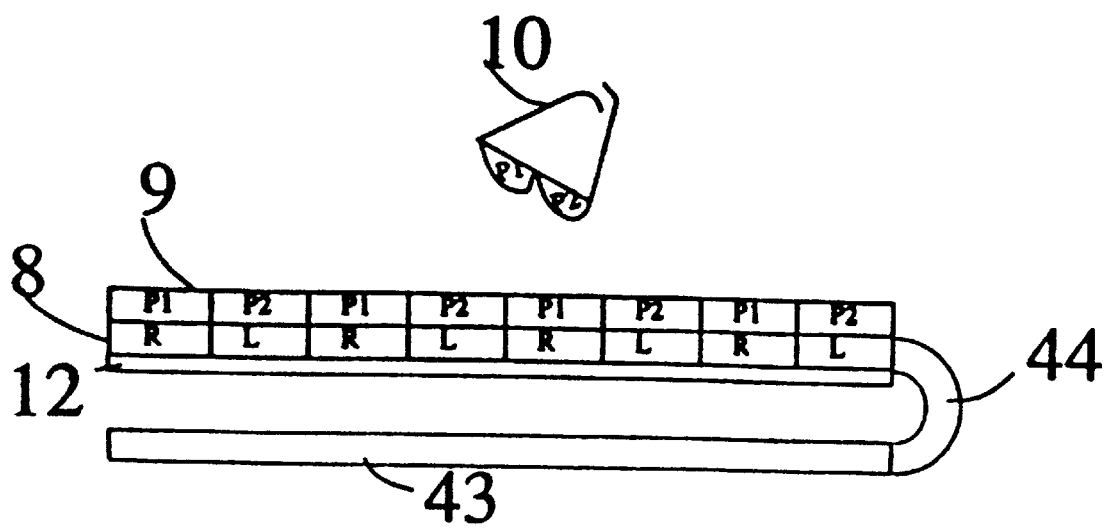
FIGS. 9a–b show cross sections of systems with ability to convert from 3-D viewing with glasses to 2-D viewing without glasses.
Figure 9B:
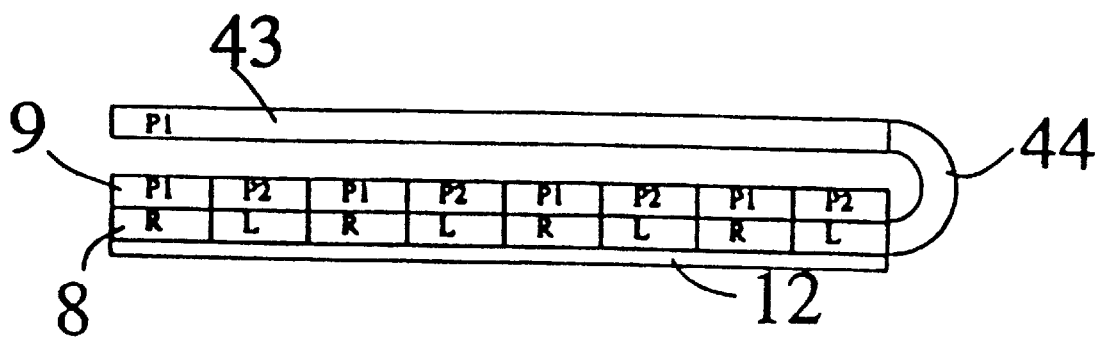

In FIG. 9, an embodiment is shown which makes it possible to convert the image from the 3-D binocular stereo mode to a flat 2-D that can viewed without glasses. A sheet polarizer 43 with a polarization state P1 is attached to the SMI film through a flexible section 44. When the polarizer 43 is in the back, FIG. 9a, the image is in the stereo mode. When the polarizer 43 is moved in front, FIG. 9b, the image is switched to the 2-D mode. In this case only the right pixels are viewed, while the left pixels covered with the P2 regions of $\mu$Pol 9 are rendered opaque by means of the P1 polarizer 43.

Figure 10A:
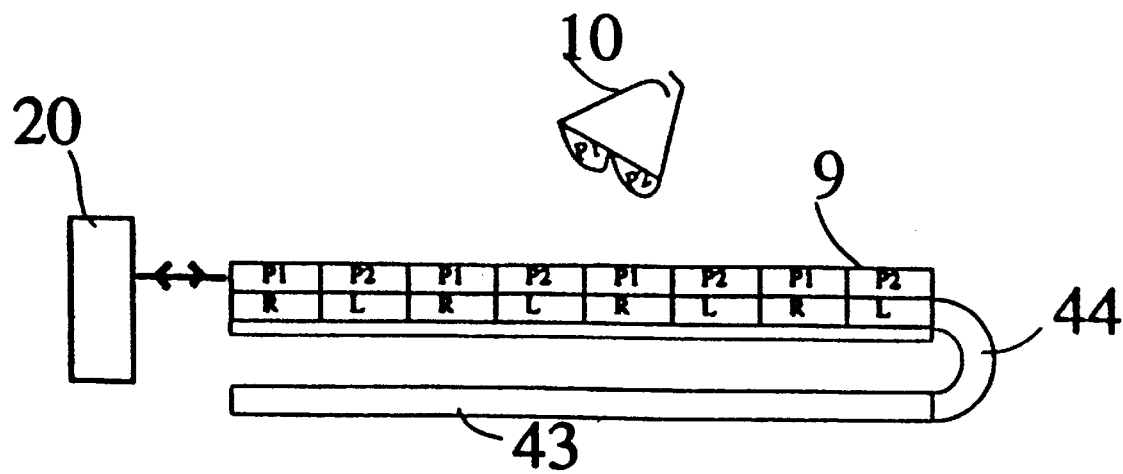
FIGS. 10a–b show cross sections of a user switchable viewing stereo mode, left only mode, or right only mode.
Figure 10B:
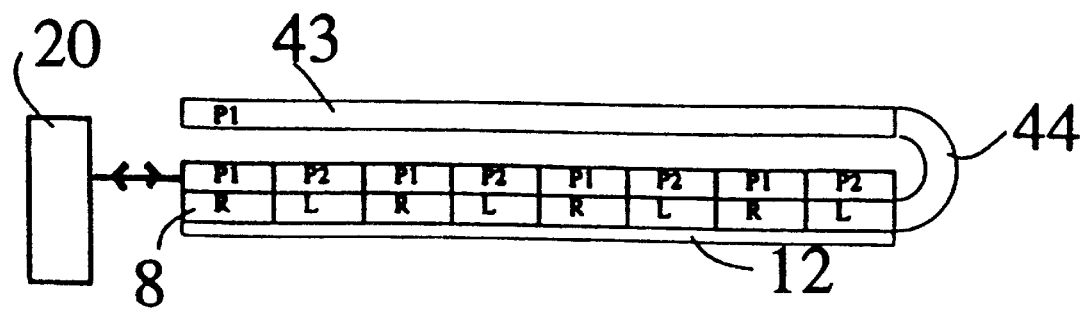
Figure 11A:
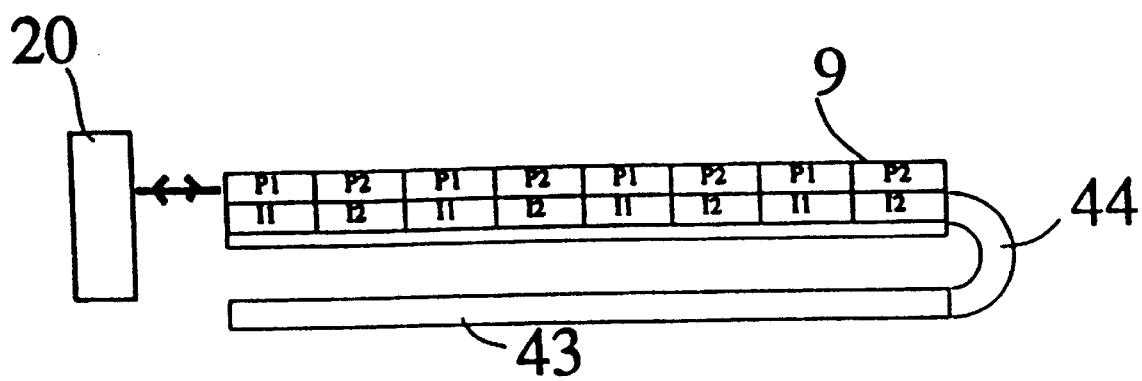
FIGS. 11a–b show cross sections of an embodiment of two different unrelated images which can be viewed in the merged mode, or switch to one image or the other mode.
Figure 11B:
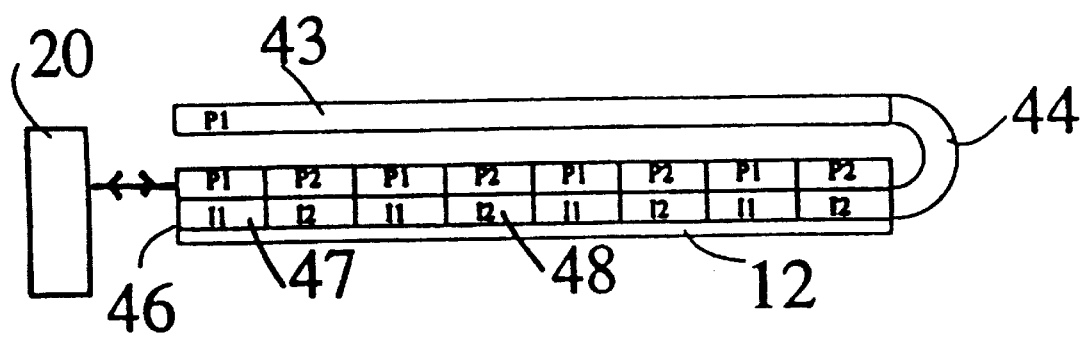

There are applications in which the users want to convert from the stereo mode to view either the left scene or the right scene, such an option is achievable by the system shown in FIG. 10. This system is essentially the same as that of FIG. 9 except that $\mu$Pol 9 is allowed to have lateral motion by means of the actuator 20. The configuration of FIG. 10a with polarizer 43 in the back, is the stereo mode. It is then converted to the 2-D mode as in FIG. 10b by moving the polarizer to the front. Since transmission takes place only through the P1 regions, it is possible to switch from viewing the right scene

What is claimed is:

1. A multi-mode image display system having a 3-D viewing mode for visually displaying a polarized spatially multiplexed image of a 3-D object, and a 2-D viewing mode for visually displaying selected image components of said polarized spatially multiplexed image, said multi-mode image display system comprising:

an electro-optical display device having a display surface and means for visually displaying on said display surface, a composite pixel pattern representative of a spatially multiplexed image composed of first and second spatially modulated perspective images of said object, said first spatially modulated perspective image consisting of a first pixel pattern representative of a first perspective image of said object spatially modulated according to a first spatial modulation pattern, said second spatially modulated perspective image consisting of a second pixel pattern representative of a second perspective image of said object spatially modulated according to a second spatial modulation pattern, said second spatial modulation pattern being the logical compliment pattern of said first spatial modulation pattern;

a micropolarization panel of electrically-passive construction, including first and second optically transparent patterns permanently formed therein, said first optically transparent pattern spatially corresponding to and being spatially aligned with said first pixel pattern displayed on said display surface so as to impart a first polarization state P1 to light emanating from said first pixel pattern and passing through said first optically transparent pattern, and said second optically transparent pattern spatially corresponding to and being spatially aligned with said second pixel pattern displayed on said display surface so as to impart a second polarization state P2 to light emanating from said second pixel pattern and passing through said second optically transparent pattern, said second polarization state P2 being different than said first polarization state P1, and said polarized light passing through said first and second optically transparent patterns forming a polarized spatially multiplexed image for use in stereoscopic viewing said 3-D object; and light transmission means for transmitting polarized light with both said first and second polarization states P1 and P2 from said micropolarization panel towards the eyes of the viewer during said 3-D viewing mode, and transmitting polarized light with either said first polarization state P1 or said second polarization state P2 from said micropolarization panel towards the eyes of the viewer during said 2-D viewing mode.

2. The multi-mode image display system of claim 1, wherein said first optically transparent pattern comprises a first polarization pattern which imparts said first polarization state P1 to light emanating from said first pixel pattern and passing through said first polarization pattern, and wherein said second optically pattern comprises a second polarization pattern which imparts said polarization state P2 to light emanating from said second pixel pattern and passing through said second polarization pattern.

3. The multi-mode image display system of claim 2, wherein said light transmission means comprises a polarization sheet.

4. The multi-mode image display system of claim 3, wherein said polarization sheet has either polarization state P1 or P2.

5. The multi-mode image display system of claim 4, wherein said light transmission means further comprises means for moving said polarization sheet in front of said micropolarization panel during said 2-D viewing mode, and away from said micropolarization panel during said 3-D viewing mode.

6. The multi-mode image display system of claim 1, wherein said electro-optical display device is selected from the group consisting of a CRT display device and a liquid crystal display device.

7. The multi-mode image display system of claim 1, in combination with an optical viewing device of electrically-passive construction, having a head supportable frame within which first and second optically transparent elements are mounted, said first optically transparent element being positionable adjacent to the left eye of a viewer, and said second optically transparent element being positionable to the right eye of the viewer, wherein said first optically transparent element is characterized by said first polarization state P1 so as to permit, during said 3-D viewing mode, the left eye of the viewer to view said first pixel pattern displayed on said display surface, while substantially preventing the left eye of the viewer from viewing said second pixel pattern displayed on said display surface, wherein said second optically transparent element is characterized by said second polarization state P2 so as to permit, during said 3-D viewing mode, the right of the viewer to view said second pixel pattern displayed on said display surface while substantially preventing the right eye of the viewer from viewing said first pixel pattern displayed on said display surface, and whereby the viewer stereoscopically views said 3-D object.

\* \* \* \* \*